United States Patent
Bowden et al.

(10) Patent No.: US 8,138,901 B2
(45) Date of Patent: Mar. 20, 2012

(54) INSTRUMENT CLUSTER MASK WITH TELL-TALES

(75) Inventors: Upton Beall Bowden, Canton, MI (US); Robert Bruno Bucciarelli, Plymouth, MI (US); Royce Duchante Channey, Ann Arbor, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 268 days.

(21) Appl. No.: 12/391,324

(22) Filed: Feb. 24, 2009

(65) Prior Publication Data

US 2010/0214097 A1    Aug. 26, 2010

(51) Int. Cl.
*B60Q 1/00* (2006.01)
(52) U.S. Cl. ............... 340/438; 340/815.4; 340/815.49
(58) Field of Classification Search .......... 340/438, 340/815.4, 815.49, 815.78; 345/4, 5, 6, 9, 345/43, 48
See application file for complete search history.

(56) References Cited

U.S. PATENT DOCUMENTS

| | | | |
|---|---|---|---|
| 5,430,612 A | 7/1995 | Simon et al. | |
| 5,510,776 A | 4/1996 | Murphy et al. | |
| 5,825,338 A * | 10/1998 | Salmon et al. | 345/7 |
| 5,865,302 A | 2/1999 | Suzuki et al. | |
| 6,025,820 A | 2/2000 | Salmon et al. | |
| 6,871,434 B2 * | 3/2005 | Sunaga et al. | 40/593 |
| 7,246,911 B2 | 7/2007 | Fong | |
| 7,494,256 B1 * | 2/2009 | Kelman et al. | 362/489 |
| 2009/0167515 A1 * | 7/2009 | Scherzinger et al. | 340/438 |

FOREIGN PATENT DOCUMENTS

| | | |
|---|---|---|
| DE | 4301038 A1 | 7/1994 |
| DE | 19859919 A1 | 7/2000 |
| DE | 102006029219 A1 | 12/2007 |
| DE | 102007004586 A1 | 8/2008 |

* cited by examiner

*Primary Examiner* — Toan N Pham
(74) *Attorney, Agent, or Firm* — Fraser Clemens Martin & Miller LLC; J. Douglas Miller

(57) ABSTRACT

An instrument cluster includes a cluster mask having a tell-tale formed therein, wherein the tell-tale includes an indicia window representing an alert to a user of the instrument cluster; and a light source for emitting light through the indicia window of the tell-tale.

20 Claims, 2 Drawing Sheets

INSTRUMENT CLUSTER MASK WITH TELL-TALES

FIELD OF THE INVENTION

The invention relates to instrument clusters for vehicles. More particularly, the invention is directed to an instrument cluster mask having tell-tales formed therein.

BACKGROUND OF THE INVENTION

Standard instrument clusters need to package a required number of tell-tales in addition to displays and mechanical gauges. Often the gauge size is limited due to the number of tell-tales that need to be laid out on the appliqué. Instrument clusters also often use masks over the appliqué to provide an additional styling appearance and depth to the cluster.

Current clusters have tell-tales designed into the appliqué. Some newer clusters also depict graphical indicia for non-required tell-tales on a liquid crystal display (LCD) in the instrument cluster.

It would be desirable to develop an instrument cluster mask having a plurality of tell-tales formed therein, thereby optimizing use of package space while providing a unique aesthetic appearance.

SUMMARY OF THE INVENTION

Concordant and consistent with the present invention, an instrument cluster mask having a plurality of tell-tales formed therein, thereby optimizing use of package space while providing a unique aesthetic appearance, has surprisingly been discovered.

In one embodiment, an instrument cluster comprises: a cluster mask having a tell-tale formed therein, wherein the tell-tale includes an indicia window representing an alert to a user of the instrument cluster; and a light source for emitting light through the indicia window of the tell-tale.

In another embodiment, an instrument cluster comprises: an appliqué having a plurality of graphical representations and indicia to communicate a vehicle condition to an operator thereof; a cluster mask disposed adjacent the appliqué, the cluster mask having a tell-tale formed therein, wherein the tell-tale includes an indicia window representing an alert to a user of the instrument cluster; and a light source for emitting light through at least one of the appliqué and the indicia window of the tell-tale.

In yet another embodiment, an instrument cluster comprises: a circuit board to provide support and electrical intercommunication between various components of the instrument cluster; an appliqué having a plurality of graphical representations and indicia to communicate a vehicle condition to an operator thereof, wherein the appliqué is disposed adjacent the circuit board; a cluster mask disposed adjacent the appliqué, the cluster mask including a plurality of tell-tales formed therein, wherein each the tell-tales includes an indicia window representing an alert to a user of the instrument cluster; and a light source for emitting light through at least one of the appliqué and the indicia window of at least one of the tell-tales.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY

Embodiments of the Invention

The following detailed description and appended drawings describe and illustrate various embodiments of the invention. The description and drawings serve to enable one skilled in the art to make and use the invention, and are not intended to limit the scope of the invention in any manner.

Figure 1:
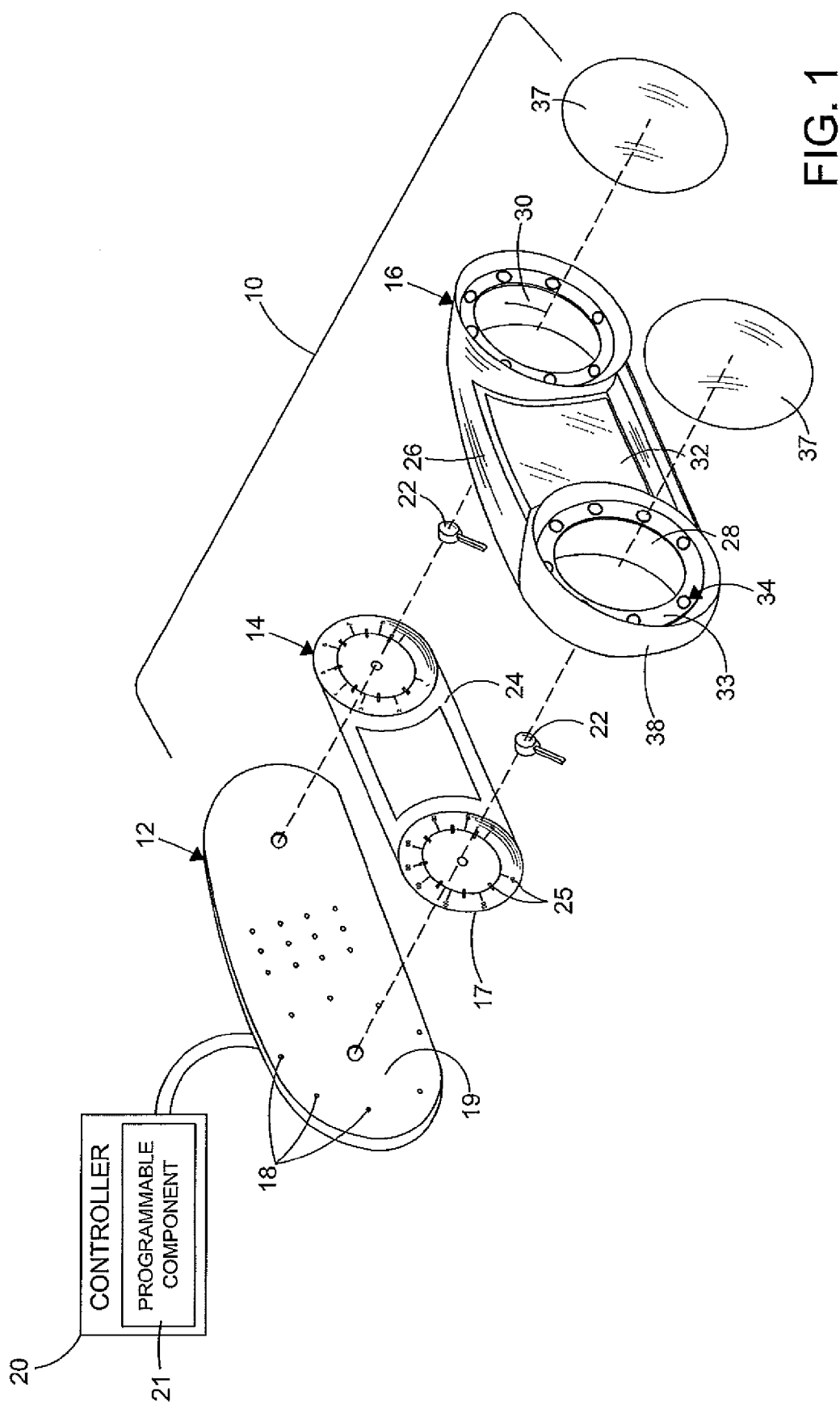
FIG. 1 is an exploded perspective view of an instrument cluster shown in electrical communication with a controller according to an embodiment of the present invention.

FIG. 1 illustrates an instrument cluster 10 according to an embodiment of the present invention. The instrument cluster 10 includes a circuit board 12, an appliqué 14, and a cluster mask 16.

The circuit board 12 is disposed adjacent a rear surface 17 of the appliqué 14. The circuit board 12 may be formed from any suitable material such as FR-2 (Phenolic cotton paper), FR-3 (Cotton paper and epoxy), FR-4 (Woven glass and epoxy), FR-5 (Woven glass and epoxy), FR-6 (Matte glass and polyester), G-10 (Woven glass and epoxy), CEM-1 (Cotton paper and epoxy), CEM-2 (Cotton paper and epoxy), CEM-3 (Woven glass and epoxy), CEM-4 (Woven glass and epoxy), CEM-5 (Woven glass and polyester), for example. Other materials for dielectric layers and conductive layers may be used. As shown, the circuit board 12 includes a plurality of light sources 18 disposed on a first surface 19 thereof. The circuit board 12 provides electrical communication between the light sources 18 and a controller 20. However, it is understood that the circuit board 12 may include other vehicle components and systems such as a source of energy, display devices (e.g. liquid crystal displays), and electronic computer modules, for example. The circuit board 12 also provides a means for mounting various devices associated with the instrument cluster 10. For example, the circuit board 12 is adapted to receive an instrument pointer 22, wherein the instrument pointer 22 is coupled to a shaft of a drive motor (not shown) for actuating the instrument pointer 22 as is known in the art. Other devices and components may be mounted to the circuit board 12.

In certain embodiments, the light sources 18 are light emitting diodes (LEDs). However, it is understood that any source of light may be used such as semi-conductor lighting, light bulbs and light pipes for example.

The controller 20 is typically an electronic controller such as a computer module, for example. However, other controllers, regulators, and actuators may be used. As shown, the controller 20 is in electrical communication with the circuit board 12 for controlling the illumination of each of the light sources 18. It is understood that the controller 20 may control other components and systems. It is further understood that the controller 20 may be in electrical communication with other systems and components. In certain embodiments, the controller 20 includes a programmable component 21 for programming the processing and control functions associated with the controller 20.

The appliqué 14 is typically formed from a plastic. However, other suitable materials known in the art of instrument clusters may be used. As shown, the appliqué 14 is disposed adjacent the circuit board 12 and is typically backlit from light rays emitted from the light sources 18. A front surface 24 of the appliqué 14 typically includes a graphical representations 25 and indicia disposed thereon to communicate vehicle conditions to an operator thereof. It is understood that any graphical representations or indicia may be used. It is further understood that the graphical representations 25 and indicia on the appliqué 14 may be formed from any suitable printing process such as screen printing, lithography, offset press, flexgraphic printing, digital printing, and in mold decorating, for example.

The cluster mask 16 (also referred to as a bezel) is typically formed from a plastic such as acrylonitrile butadiene styrene (ABS), for example. However, the cluster mask 16 may be constructed, fabricated, molded and the like from any suitable material including, but not limited to, fiberglass, carbon fiber, metal, and the like. It is understood that the cluster mask 16 may be formed as a single, integral piece, or as two or more pieces. It is further understood that components of the cluster mask 16 may have a pre-determined design including variations in a depth of the cluster mask 16 to provide a three dimensional appearance to the instrument cluster 10. As shown, the cluster mask 16 is disposed adjacent the circuit board 12, thereby sandwiching the appliqué 14, therebetween. However, the cluster mask 16 may have any shape, size, design, and position relative to the appliqué 14.

In the embodiment shown, the cluster mask 16 includes a main body 26 having a plurality of instrument gauge viewing windows 28, 30 and a central display viewing window 32. It is understood any number of viewing windows 28, 30, 32 having any shape or size may be included in the cluster mask 16. It is further understood that each of the viewing windows 28, 30, 32 may include a covering 37 or lens disposed on a first side 33 of the cluster mask 16 to protect the instrument pointer, as well as other components, from damage and tampering.

Figure 2:
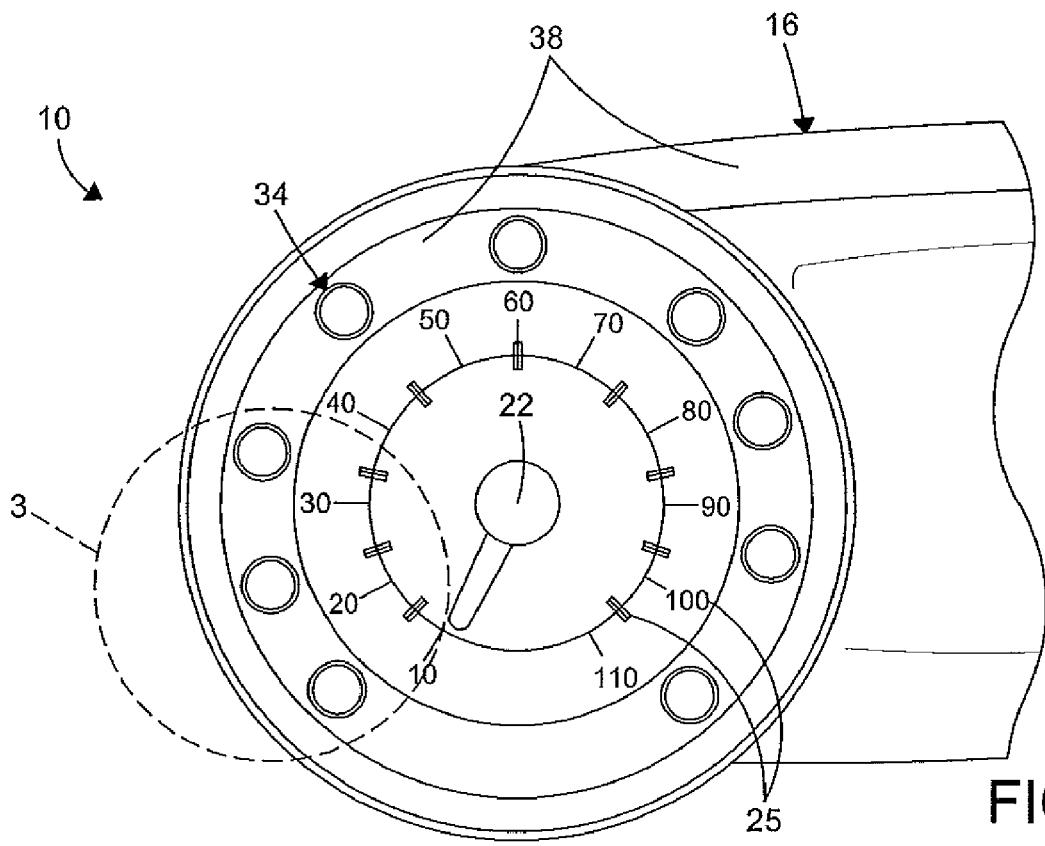
FIG. 2 is a fragmentary front elevational view of the instrument cluster of FIG. 1.
Figure 3:
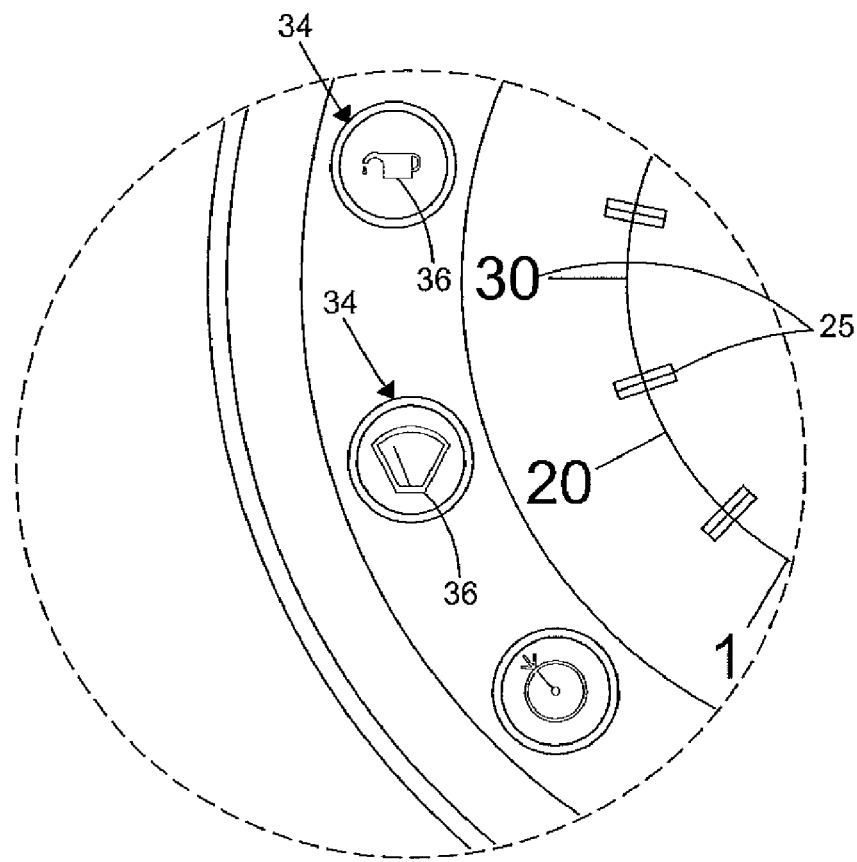
FIG. 3 is an enlarged fragmentary front elevational view of a portion of the instrument cluster illustrated in FIG. 2 and depicted by circle 3 therein.

As more clearly shown in FIGS. 2 and 3, the cluster mask 16 includes a plurality of tell-tales 34 (also referred to as "tell tales", "telltales", and "tell tails") formed in the first side 33 of the cluster mask 16. Specifically, the tell-tales 34 are formed to allow light rays from the light sources 18 to pass through an indicia window 36 representing a particular "alert" or "warning" to a user of the vehicle. As a non-limiting example, the tell-tales 34 are formed around a peripheral portion of each of the instrument gauge viewing windows 28, 30 in a substantially circular pattern. However, any placement or pattern of tell-tales 34 may be used. It is understood that the tell-tales 34 may be formed in the cluster mask 16 during a particular forming process of the cluster mask 16 or in a post production process after the cluster mask 16 has been completely formed. It is further understood that any number of tell-tales 34 may be formed having any size and shape. As a non-limiting example, the indicia windows 36 of each of the tell-tales 34 may represent a conventional tell-tale symbol normally provided on a conventional appliqué or other display device. However, any indicia window and symbol may be used to present an alert to the user.

In certain embodiments, the cluster mask 16 includes a film 38 disposed over the cluster mask 16. Specifically, the cluster mask 16 may be covered in a heated or vacuum molded film that is color matched to interior trim. Additionally, the applied film 38 may allow light to pass one way through the film 38 (i.e. for backlighting) while blocking light rays passing through in an opposite direction. As a non-limiting example, the manufacturer 3M offers a vacuum and a heat forming film application including various levels of transparency to allow the tell-tale illumination to shine through the film material. Accordingly, the film 38 provides a "hidden" effect to the molded tell-tales 34 until the indicia window 36 of a particular tell-tale 34 is illuminated.

In use, the circuit board 12 provides mounting and electrical intercommunication to various systems and components of the vehicle, in particular, the light sources 18 disposed on the first surface 19 of the circuit board 12. The appliqué 14 is disposed adjacent the circuit board 12 to provide a graphical indicia to the functional elements associated with the instrument cluster 10 (e.g. the instrument pointer 22). The cluster mask 16 is mounted to the circuit board 12 (either directly or through other mounting brackets) to enclose the appliqué 14 therebetween. Once the cluster mask 16 is in a suitable position, the controller 20 selectively illuminates a number of the light sources 18, thereby providing a backlighting to the instrument cluster 10. In particular, the light source 18 may be selectively controlled to illuminate a particular indicia window 36 of one of the tell-tales 34 to alert the user. Where the indicia window 36 is not illuminated by backlight, the associate tell-tale 34 appears blended with the main body 26 of the cluster mask 16 and is in a "hidden" state. Once the indicia window 36 is illuminated, the tell-tale 34 is clearly displayed to the user.

By molding the tell-tales 34 into the cluster mask 16 that overlay the appliqué 14, available space on the appliqué 14 can be used for gauge layout, thereby providing design freedom and flexibility. Additionally, placing the tell-tales 34 in the cluster mask 16 maximizes efficient use of package space that is otherwise wasted. Furthermore, the tell-tales 34 in the cluster mask 16 provide a unique aesthetic appearance.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. An instrument cluster comprising:
    a cluster mask having a tell-tale formed therein, wherein the tell-tale includes an indicia window representing an alert to a user of the instrument cluster; and
    a light source for emitting light through the indicia window of the tell-tale.

2. The instrument cluster according to claim 1, wherein variations in a depth of the cluster mask provide a three dimensional appearance to the instrument cluster.

3. The instrument cluster according to claim 1, wherein the cluster mask includes at least one instrument gauge viewing window.

4. The instrument cluster according to claim 3, wherein the tell-tale is formed adjacent the at least one instrument gauge viewing window of the cluster mask.

5. The instrument cluster according to claim 1, wherein the cluster mask includes a film disposed over at least one surface thereof, the film providing a "hidden" effect to the tell-tale.

6. The instrument cluster according to claim 1, further comprising a controller in electrical communication with the light source for controlling an illumination thereof.

7. The instrument cluster according to claim 6, wherein the controller includes a programmable component for programming a processing function and a control function associated with the controller.

8. The instrument cluster according to claim 1, wherein the light source is mounted on a circuit board.

9. An instrument cluster comprising:
- an appliqué having a plurality of graphical representations and indicia to communicate a vehicle condition to an operator thereof;
- a cluster mask disposed adjacent the appliqué, the cluster mask having a tell-tale formed therein, wherein the tell-tale includes an indicia window representing an alert to a user of the instrument cluster; and
- a light source for emitting light through at least one of the appliqué and the indicia window of the tell-tale.

10. The instrument cluster according to claim 9, wherein variations in a depth of the cluster mask provide a three dimensional appearance to the instrument cluster.

11. The instrument cluster according to claim 9, wherein the cluster mask includes at least one instrument gauge viewing window.

12. The instrument cluster according to claim 11, wherein the tell-tale is formed adjacent the at least one instrument gauge viewing window of the cluster mask.

13. The instrument cluster according to claim 9, wherein the cluster mask includes a film disposed over at least one surface thereof, the film providing a "hidden" effect to the tell-tale.

14. The instrument cluster according to claim 9, further comprising a controller in electrical communication with the light source for controlling an illumination thereof.

15. The instrument cluster according to claim 9, wherein the light source is mounted on a circuit board.

16. An instrument cluster comprising:
- a circuit board to provide support and electrical intercommunication between various components of the instrument cluster;
- an appliqué having a plurality of graphical representations and indicia to communicate a vehicle condition to an operator thereof, wherein the appliqué is disposed adjacent the circuit board;
- a cluster mask disposed adjacent the appliqué, the cluster mask including a plurality of tell-tales formed therein, wherein each of the tell-tales includes an indicia window representing an alert to a user of the instrument cluster; and
- a light source for emitting light through at least one of the appliqué and the indicia window of at least one of the tell-tales.

17. The instrument cluster according to claim 16, wherein variations in a depth of the cluster mask provide a three dimensional appearance to the instrument cluster.

18. The instrument cluster according to claim 16, wherein the cluster mask includes a film disposed over at least one surface thereof, the film providing a hidden effect to at least one of the tell-tales.

19. The instrument cluster according to claim 16, further comprising a controller in electrical communication with the light source for controlling an illumination thereof.

20. The instrument cluster according to claim 16, wherein the cluster mask includes at least one instrument gauge viewing window and the tell-tales are circumferentially disposed around the at least one instrument gauge viewing window of the cluster mask.

* * * * *